United States Patent [19]
Kress et al.

[11] Patent Number: 4,838,136
[45] Date of Patent: Jun. 13, 1989

[54] ROTARY TOOL FOR OUTER WORKING OF ROTATION-SYMMETRICAL WORKPIECES

[75] Inventors: Dieter Kress, Aalen; Friedrich Häberle, Lauchheim, both of Fed. Rep. of Germany

[73] Assignee: Napal Fabrik für Prazisionswerkzeuge Dr. Kress KG, Aalen, Fed. Rep. of Germany

[21] Appl. No.: 124,821

[22] Filed: Nov. 24, 1987

[30] Foreign Application Priority Data

Nov. 25, 1986 [DE] Fed. Rep. of Germany ....... 3640202

[51] Int. Cl.$^4$ .......................... B23B 5/00; B26D 1/12; B23D 15/28
[52] U.S. Cl. ........................................ 82/20; 82/2 E; 407/11; 407/33
[58] Field of Search ............... 82/35, 20, 2 E; 407/11, 407/33, 45, 1

[56] References Cited

U.S. PATENT DOCUMENTS

| | | | |
|---|---|---|---|
| 259,377 | 6/1882 | Flower | 82/35 |
| 2,377,888 | 6/1945 | King | 82/20 |
| 2,545,931 | 3/1951 | Samsky | 82/35 X |
| 2,653,517 | 9/1953 | Pigott | 407/11 X |
| 4,095,916 | 6/1978 | Hammond | 407/11 X |
| 4,213,354 | 7/1980 | Dahinden | 407/11 X |

*Primary Examiner*—Eugene R. LaRoche
*Assistant Examiner*—Nathan W. McCutcheon
*Attorney, Agent, or Firm*—Horst M. Kasper

[57] ABSTRACT

A rotary tool for outer working of rotation-symmetrical workpieces has a cutting head formed as a hollow body having a side wall and a groove, a cutting device arranged in the groove of the side wall, and a guide for a workpiece, provided at an inner side of the cutting head at least in the region of the cutting device.

21 Claims, 2 Drawing Sheets

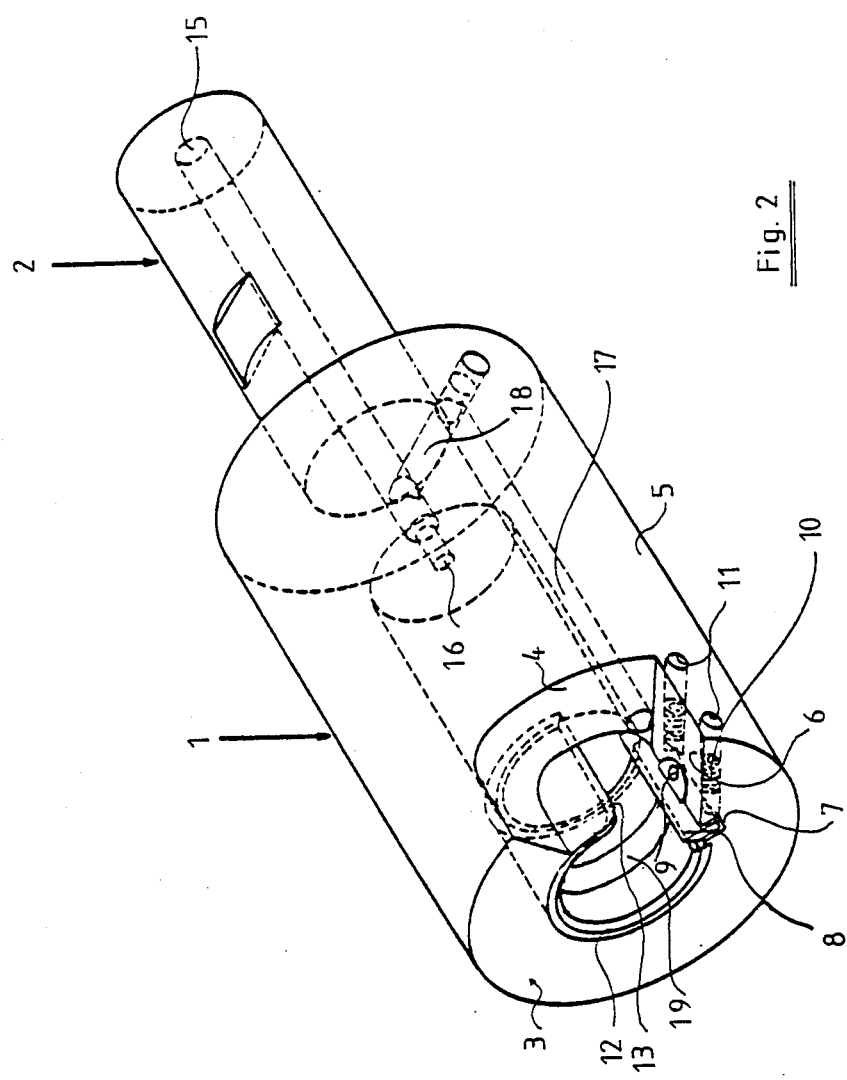

ROTARY TOOL FOR OUTER WORKING OF ROTATION-SYMMETRICAL WORKPIECES

BACKGROUND OF THE INVENTION

The present invention relates to a rotary tool for working of rotation-symmetrical workpieces.

During production of rotation-symmetrical workpieces with fine quality, the workpiece is first worked on rotary automated machine-tools and then subjected to grinding. The fine working of a workpiece on coarse working machine in absence of suitable tools, often encounters difficulties, so that a workpiece must be worked on different machines. This results in considerable time consumption and additional costs for preparing several machine-tools for operation.

SUMMARY OF THE INVENTION

Accordingly, it is an object of the present invention to provide a rotary tool which avoids the disadvantages of the prior art.

More particularly, it is an object of the present invention to provide a rotary tool which allows performing a coarse and fine treatment of a workpiece on a same working machine and obtaining exact size tolerances and outer surfaces with a high quality.

In keeping with these objects and with others which will become apparent hereinafter, one feature of the present invention resides, briefly stated, in a rotary tool having a cutting head, cutting means arranged in a groove of a side wall of the cutting head, wherein a guide for a workpiece is provided at an inner side of the cutting head at least in the region of the cutting means.

When the rotary tool is designed in accordance with the present invention, a workpiece to be worked is supplied into the hollow space of the cutting head, and the rotary tool rotates relative to the workpiece or vice versa. Thereby the outer side of the workpiece is worked by the cutting means. Since the guide is provided at least in the region of the cutting means, very accurate size tolerances and exceptional surface quality are achieved.

In accordance with an especially advantageous embodiment of the invention, the cutting head is provided in the region of the cutting means with a recess which extends in the longitudinal direction of the cutting head so as to produce good chip evacuation.

In accordance with a further advantageous embodiment of the present invention, the inner side of the guide which substantially coincides with the inner side of the cutting head, is provided with several guiding strips which extend parallel to the center axis of the cutting head. This construction leads to improved guiding of the rotary tool and thereby to further improvement of the surface quality of the workpiece to be worked.

In another advantageous embodiment, the guide is provided at its inner side with a guiding ring extending concentrically to the center axis of the cutting head and provided with recesses in the region of the cutting means.

In a further advantageous embodiment of the invention the shaft and side wall of the cutting head have openings which are connected with one another, for supplying a cooling fluid into the region of the cutting means. This feature provides improvement of surface quality of the workpiece and also increases the service life of the tool.

The novel features of the present invention are set forth in particular in the appended claims. The invention itself, however, will be best understood from the following description of preferred embodiments which is accompanied by the following drawings.

BRIEF DESCRIPTION OF THE DRAWINGS

FIG. 2 is a view showing a rotary tool in accordance with another embodiment of the present invention, provided with a guide with a concentric guiding ring.

DESCRIPTION OF PREFERRED EMBODIMENTS

Figure 1:
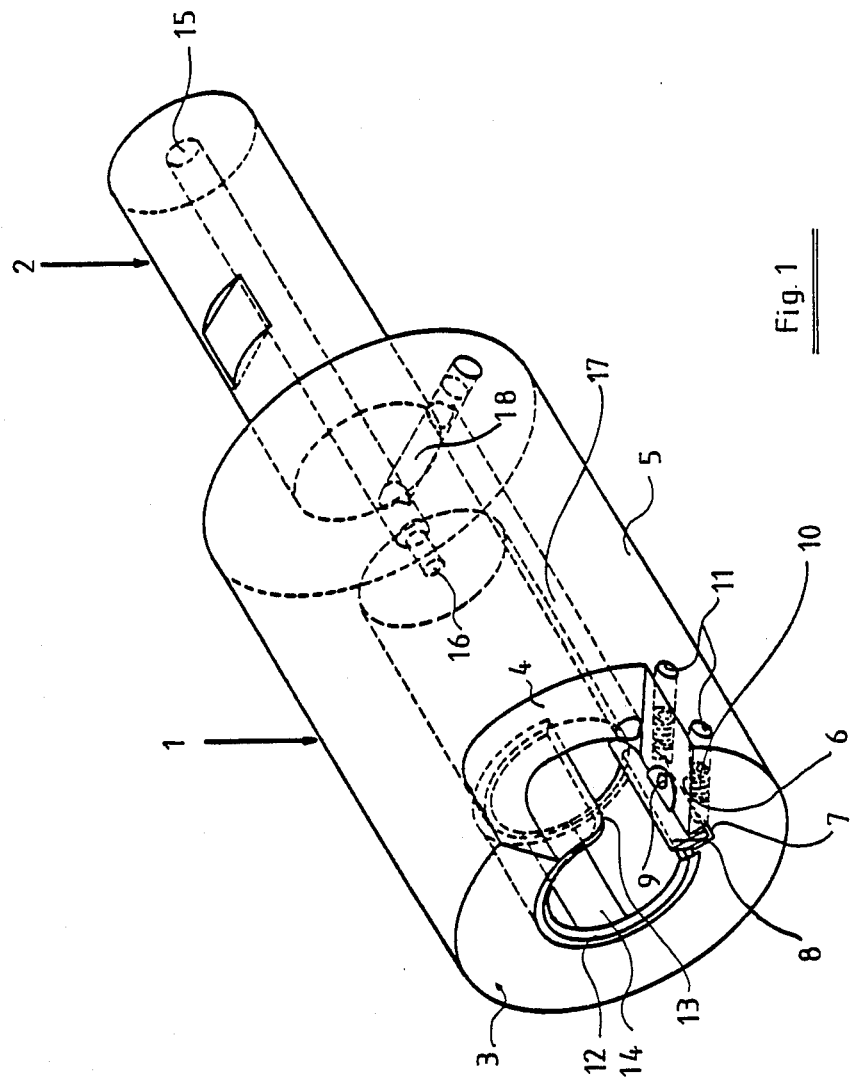
FIG. 1 is a view showing a rotary tool is accordance with one embodiment of the present invention, provided with a guide formed with at least one guiding strip.

FIG. 1 shows schematically a rotary tool with a cutting head 1 formed as a hollow cylinder and with a shaft 2. A sector-shaped recess 4 extends in a side wall 5 of the cutting head 1, starting from its end side 3. A groove 7 is formed in one flank 6 of the recess 4, and a cutting plate 8 is inserted in this groove. The cutting plate 8 has a cutting edge which extends in the inner space of the cutting head 1. A clamping tooth 9 is inserted in the wall of the cutting head 1, so that the cutting plate 8 it pressed against the rear flank of the groove 7, as considered in direction of rotation, by means of a clamping screw. The clamping tooth 9 lies on the front of the cutting plate 8.

The cutting plate 8 is adjusted exactly radially in the cutting head. A not shown adjustable body is provided for this adjustment and is wedge-shaped on its front end. The position of the adjusting body is adjusted and fixed by an adjusting element which can be formed as stud screws or threaded pins 10. The threaded pins are screwed in adjusting openings 11 which are formed in the cutting head 1 and provided with an inner thread.

A guide 12 is provided in the front part of the cutting head 1 at its inner wall. The guide 12 extends at least over the length of the cutting plate 8 and is composed of a wear-resistant material, for example hard metal. The guide 12 is formed as a sleeve. It serves for guiding of a workpiece to be worked and is connected with the side wall 5 of the cutting head 1 so that it cannot rotate inside the cutting head. For allowing the outflow of chips, the sleeve is provided with a longitudinal recess 13. The opening angle of the longitudinal recess is smaller than that of the recess 4 in the side wall 5 of the cutting head 1.

The inner wall of the sleeve which has a predetermined inner radius, can also have a smooth cylindrical outer surface. On the other hand, as shown in FIG. 1, it can have a raised portion which serves as a guiding strip. At least one or preferably two such guiding strips 14 can be provided. In the case when two guiding strips are arranged on the sleeve, one guiding strip can be arranged after the cutting plate by 40° as considered in direction of rotation of the rotary tool, while the other guiding strip abuts against the cutting plate.

The inner wall of the guide 12 can be formed conical, as well as the remaining cutting head 1. The cutting edge of the cutting plate 8 is arranged so that it extends parallel to the inner wall and extends into the hollow space of the cutting head 1. This is true for both embodiments of FIG. 1 and FIG. 2.

In the embodiment shown in FIG. 1 the cylindrical shaft 2 has an axial first opening 15 for supplying a cooling medium. It extends to the hollow space of the cutting head 1. An opening passage 16 with a diamter which is smaller than the diameter of the first opening 15, communicates the hollow space with the first opening 15. For supplying the cooling medium directly to the cutting plate 8, the wall 5 of the cutting head 1 is provided with a second opening 17 which preferably extends substantially parallel to the central axis of the rotary tool. The second opening 17 communicates with the first opening 15 via a radial opening 18.

FIG. 2 shows a second embodiment of the rotary tool in accordance with the present invention. Same parts are identified in this embodiment with same reference numerals as in the first embodiment.

As can be seen from FIG. 2, the inner side of the guide 12 which is also formed as a sleeve, is provided with a guiding ring 19 extending concentrically to the central axis of the rotary tool. It serves for guiding a workpiece to be worked. Instead of one guiding ring, several guiding rings can also be provided. In this embodiment it is also possible to make the inner wall of the guiding sleeve 12 conical.

The inner radius of the guide 12 in the region located after the cutting plate 8 as considered in the direction of rotation of the rotary tool, is greater than the inner radius in the remaining regions. This improves the supply of cooling medium and withdrawal of chips. The region with a greater inner diameter extends approximately over the sector of 30°.

For working of longer workpieces, the shaft 2 of the rotary tool can also be formed as a hollow body. The outer diameter of the shaft must then be increased relative to the diameter shown in FIGS. 1 and 2.

The invention is not limited to the details shown, since various modifications and structural changes are possible without departing in any way from the spirit of the present invention.

The embodiment of the invention in which an exclusive property or privilege is claimed are defined as follows:

1. A rotary tool for outer working of rotation-symmetrical workpieces, comprising
   a cutting head formed as a hollow body having a side wall and a groove and rotatable in a predetermined direction;
   cutting means having a predetermined length and arranged in said groove of said side wall; and
   a guide for a workpiece, provided at an inner side of said cutting head at least in the region of said cutting means, wherein said guide is formed as a sleeve provided in said side wall of said cutting head and connected with said cutting head and wherein said guide extends over the whole length of said cutting means and wherein the guide has a first inner radius in an angular region which is located after said cutting means when advancing in the direction of the rotation, and a second inner radius in a remaining region, said first inner radius being greater than said second inner radius.

2. A rotary tool as defined in claim 1, wherein said cutting head has a center axis, said guide having an inner side and being provided at said inner side of said guide with at least one guiding strip extending parallel to said center axis.

3. A rotary tool as defined in claim 1, wherein said cutting head has a center axis, said guide having an inner side and being provided at said inner side of said guide with a guiding ring which extends concentrically to said center axis and provided with recesses in the region of said cutting means.

4. A rotary tool as defined in claim 1, wherein said cutting head being elongated, said cutting head having a recess provided in the region of said cutting means and extending in a longitudinal direction of said cutting head.

5. A rotary tool as defined in claim 4, wherein said recess is sector-shaped.

6. A rotary tool as defined in claim 4, wherein said cutting means has a predetermined length, said recess extending at least over the length of said cutting means.

7. A rotary tool as defined in claim 1, wherein said cutting head has an end surface, said cutting means extending outwardly beyond said end surface of said cutting means.

8. A rotary tool as defined in claim 1, wherein said cutting head has an end surface, said groove extending to said end surface of said cutting head.

9. A rotary tool as defined in claim 1, said wall of said cutting head is provided with openings which extend to said groove and provided with inner threads for receiving an element for radially adjusting said cutting means.

10. A rotary tool as defined in claim 1; and further comprising a shaft associated with said cutting head and provided with an axial opening for supplying a cooling medium.

11. A rotary tool as defined in claim 10, wherein said side wall of said cutting head has a further opening which communicates with said axial opening of said shaft and extends to said cutting means.

12. A rotary tool as defined in claim 10, wherein said axial opening has a passage which opens into a hollow space of said cutting head and has a predetermined diameter, said wall of said cutting head having a further opening extending to said cutting means and having a diameter which is greater than the diameter of said passage.

13. A rotary tool as defined in claim 1, wherein said cutting head has a central axis and an inner hollow of a predetermined diameter; and further comprising a shaft associated with said cutting head and having an opening which is concentric to said central axis and has a diameter which corresponds to said diameter of said inner hollow.

14. A rotary head as defined in claim 1, wherein said guide is composed of a wear-resistant material.

15. A rotary tool as defined in claim 1, wherein said cutting means has a cutting plate arranged in said groove; and further comprising a clamping tooth arranged to clamp said cutting plate.

16. A rotary tool as defined in claim 1 wherein the region with a greater inner diameter extends over a sector of about 30 degrees.

17. A rotary tool as defined in claim 1 wherein the guide has an inner wall with a predetermined radius and a smooth cylindrical outer surface.

18. A rotary tool as defined in claim 1 wherein the guide has an inner wall with a raised portion which serves as a guiding strip.

19. A rotary tool as defined in claim 18 wherein the guiding strip is disposed angularly spaced relative to the cutting plate at an angle of about 40 degrees and where a second guiding strip abuts against the cutting means.

20. A rotary tool as defined in claim 1, further comprising a shaft associated with said cutting head and provided with an axial opening for supplying cooling medium; and wherein said cutting head being elongated, said cutting head having a recess provided in the region of said cutting means and extending in a longitudinal direction of said cutting head.

21. A rotary tool for outer working of rotation-symmetrical workpieces, comprising a cutting head formed as a hollow body having a side wall and a groove;

cutting means, including a cutting plate (8), arranged in said side wall; and a guide for a workpiece, provided at an inner side of said cutting head at least in the region of said cutting means, wherein the guide (12) is formed as a sleeve embedded in the side wall (5) of the cutting head (1), where said guide (12) is connected with the side wall and extends over the entire length of the cutting plate (8), and where the inner radius of the guide is larger in a first region, than in a remaining second region of the guide, which first region extends over a sector of 30 degrees and is disposed after the tool of the cutting plate (8) in the direction of rotation.

* * * * *

UNITED STATES PATENT AND TRADEMARK OFFICE
CERTIFICATE OF CORRECTION

PATENT NO. : 4,838,136
DATED : June 13, 1989
INVENTOR(S) : Kress et al

It is certified that error appears in the above-identified patent and that said Letters Patent is hereby corrected as shown below:

Title page, under (73) Assignee: "Napal"

should read --Mapal--.

Signed and Sealed this

Ninth Day of October, 1990

Attest:

HARRY F. MANBECK, JR.

*Attesting Officer*   *Commissioner of Patents and Trademarks*